United States Patent
Correll et al.

(10) Patent No.: US 7,730,301 B2
(45) Date of Patent: Jun. 1, 2010

(54) METHOD AND SYSTEM FOR ENCRYPTING TRANSMISSIONS OF COMMUNICATION DATA STREAMS VIA A PACKET-ORIENTED COMMUNICATION NETWORK

(75) Inventors: Christian Correll, Munich (DE); Karl Klug, Miesbach (DE)

(73) Assignee: Siemens Aktiengesellschaft, Munich (DE)

( * ) Notice: Subject to any disclaimer, the term of this patent is extended or adjusted under 35 U.S.C. 154(b) by 1861 days.

(21) Appl. No.: 10/720,743

(22) Filed: Nov. 25, 2003

(65) Prior Publication Data

US 2004/0153643 A1    Aug. 5, 2004

(30) Foreign Application Priority Data

Nov. 25, 2002   (DE)   ................. 102 54 906

(51) Int. Cl.
*H04L 29/08* (2006.01)
*H04L 29/02* (2006.01)

(52) U.S. Cl. .................. 713/160; 713/161; 713/153

(58) Field of Classification Search ......... 713/160–162, 713/165–167, 151–154; 726/13, 30
See application file for complete search history.

(56) References Cited

U.S. PATENT DOCUMENTS

| 6,091,820 | A * | 7/2000 | Aziz | 380/30 |
|---|---|---|---|---|
| 6,304,914 | B1 * | 10/2001 | Deo et al. | 709/247 |
| 6,931,025 | B1 * | 8/2005 | Masuda | 370/466 |
| 2002/0087708 | A1 * | 7/2002 | Low et al. | 709/231 |
| 2002/0196787 | A1 * | 12/2002 | Rajan et al. | 370/393 |
| 2003/0133461 | A1 * | 7/2003 | Ho et al. | 370/395.52 |
| 2004/0064688 | A1 * | 4/2004 | Jacobs | 713/150 |

OTHER PUBLICATIONS

Subbiah et al., "RTP Payload Multiplexing between IP Telephony Gateways", Global Telecommunications Conference, 1999, vol. 2, pp. 1121-1127.

Tounsi et al., "Small Packet Aggregation in an IP Domain", 6$^{th}$ IEEE Symposium on Computers and Communications, 2001, vol. 1, pp. 708-713.

McGregor et al., "Performance Impact of Data Compression on Virtual Private Network Transactions", 25$^{th}$ Annual IEEE Conference on Local Computer Networks, 2000, pp. 500-510.

* cited by examiner

*Primary Examiner*—Jung Kim
*Assistant Examiner*—Venkat Perungavoor
(74) *Attorney, Agent, or Firm*—Staas & Halsey LLP

(57) ABSTRACT

A collective packet generator forms collective Internet Protocol (IP) data packets, each of which contains several IP data packets of different communication data streams, for encrypted transmission of each of the communication data streams as a sequence of IP data packets. A particular collective IP data packet is encrypted by an encryption module for encrypting IP data packets. The encrypted collective IP data packets are then transmitted via a communication network.

8 Claims, 2 Drawing Sheets

METHOD AND SYSTEM FOR ENCRYPTING TRANSMISSIONS OF COMMUNICATION DATA STREAMS VIA A PACKET-ORIENTED COMMUNICATION NETWORK

CROSS REFERENCE TO RELATED APPLICATIONS

This application is based on and hereby claims priority to German Application No. 10254906.0 filed on Nov. 25, 2002, the contents of which are hereby incorporated by reference.

BACKGROUND OF THE INVENTION

In modern communication systems, communication connections, particularly real time connections, e.g., for voice, video and/or multimedia communication, are increasingly also by packet-oriented communication networks such as local area networks or wide area networks. For this purpose, transmission protocols from the TCP/IP (Transmission Control Protocol/Internet Protocol) family of protocols are used. A communication connection, for example for voice, video and/or multimedia communication transmitted by the Internet protocol, referred to in the following as IP, is also frequently called a VoIP (Voice/Video over Internet Protocol) connection.

VoIP connections are frequently carried out via public wide area networks such as the Internet, where network nodes participating in the transmission can in principle access the IP data packets transmitted within the framework of the VoIP communication connections. To nevertheless guarantee confidentiality of VoIP communication connections, VoIP communication data streams can be transmitted encrypted.

The IPSec (Internet Protocol Security) protocol is normally used for the transmission of IP-based communication data streams, i.e., those present as a sequence of IP data packets. By this IPSec protocol, each IP data packet to be transmitted within the context of a secure communication connection is individually encrypted and the encrypted IP data packet is transmitted.

The encryption of a VoIP data packet, however, requires a relatively high computing effort. As a rule, the maximum number of VoIP packets that can be encrypted per time unit by a transmission assembly is limited by its available processor power. In practice, the number of encrypted VoIP connections that can be carried in parallel via a transmission assembly is substantially lower than the corresponding number of unencrypted VoIP connections, because of the high encryption cost. For example, tests have shown that a typical transmission group designed for 120 unencrypted parallel VoIP connections can only encrypt 10 VoIP connections in parallel.

SUMMARY OF THE INVENTION

An object of the invention is to provide a method and a system that enables the encrypted transmission of a higher number, measured against prior art, of parallel IP communication data streams.

For the encrypted transmission of communication data streams, present in each case as a succession of IP data packets, via a packet-oriented communication network, such as a local area network or wide area network, collective IP data packets that in each case contain several IP data packets of different communication streams are formed by a collective packet generator. A collective IP data packet is in each case encrypted by a, preferably standard, encryption module for the encryption of IP data packets. The encrypted collective IP data packets are then transmitted via the communication network.

By combining several IP data packets to form an encrypted collective IP data packet, the computing cost required for encryption can be substantially reduced because the encryption of the collective IP data packet is less expensive than a separate encryption of the single contained IP data packets. This saving in computing time is due to the fact that encryption expense for an IP data packet is divided into (1) preparing for encryption, the computing expense of which is not related to the size of the IP data packet, and (2) performing the encryption, the computing expense of which is proportional to the size of the IP data packet. When encrypting a collective IP data packet, the preparation of the encryption has to be performed only once, i.e., for the collective IP data packet, and not several times as is the case where each individual contained IP data packet is separately encrypted. For normal VoIP communication connections, the achievable saving in communication time is comparatively high because VoIP data packets are relative small and consequently the preparation of the encryption of an IP data packet of this kind often takes longer than the performance of the encryption itself.

Because of the substantial reduction in the total computing cost, the invention enables substantially more communication data streams to be encrypted and transmitted in parallel at a given computing power.

In accordance with an advantageous form of embodiment of the invention, the collective IP data packets can be transmitted by an encrypted tunneling method on the network layer, i.e., layer 3 of the OSI reference model. The encryption model can have an encapsulation module to encapsulate in a second IP data packet data encrypted in the encryption module of a first IP data packet. Compared with the protocols, such as PPTP, L2F or L2TP active on layer 2 of the OSI reference model, an encryption protocol active on the network layer is substantially more secure.

Furthermore, whether the communication data streams have a common transmission destination can be determined advantageously by an address comparison device. The transmission destination in this case is also taken to mean an intermediate transmission destination. A particular collective IP data packet can be formed exclusively from IP data packets of communication data streams with a common transmission destination.

Furthermore, a particular collective IP data packet can be formed from IP data packets of different communication data streams that occur within a specified time interval. A timer can be provided to set the time interval. By setting a time interval within which IP data packets to be transmitted in a single collective IP data packet must occur, the transmission delay for the communication data streams can be limited. Preferably, IP data packets present in parallel in an input register at a particular time point can be assembled to form a collective IP data packet.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
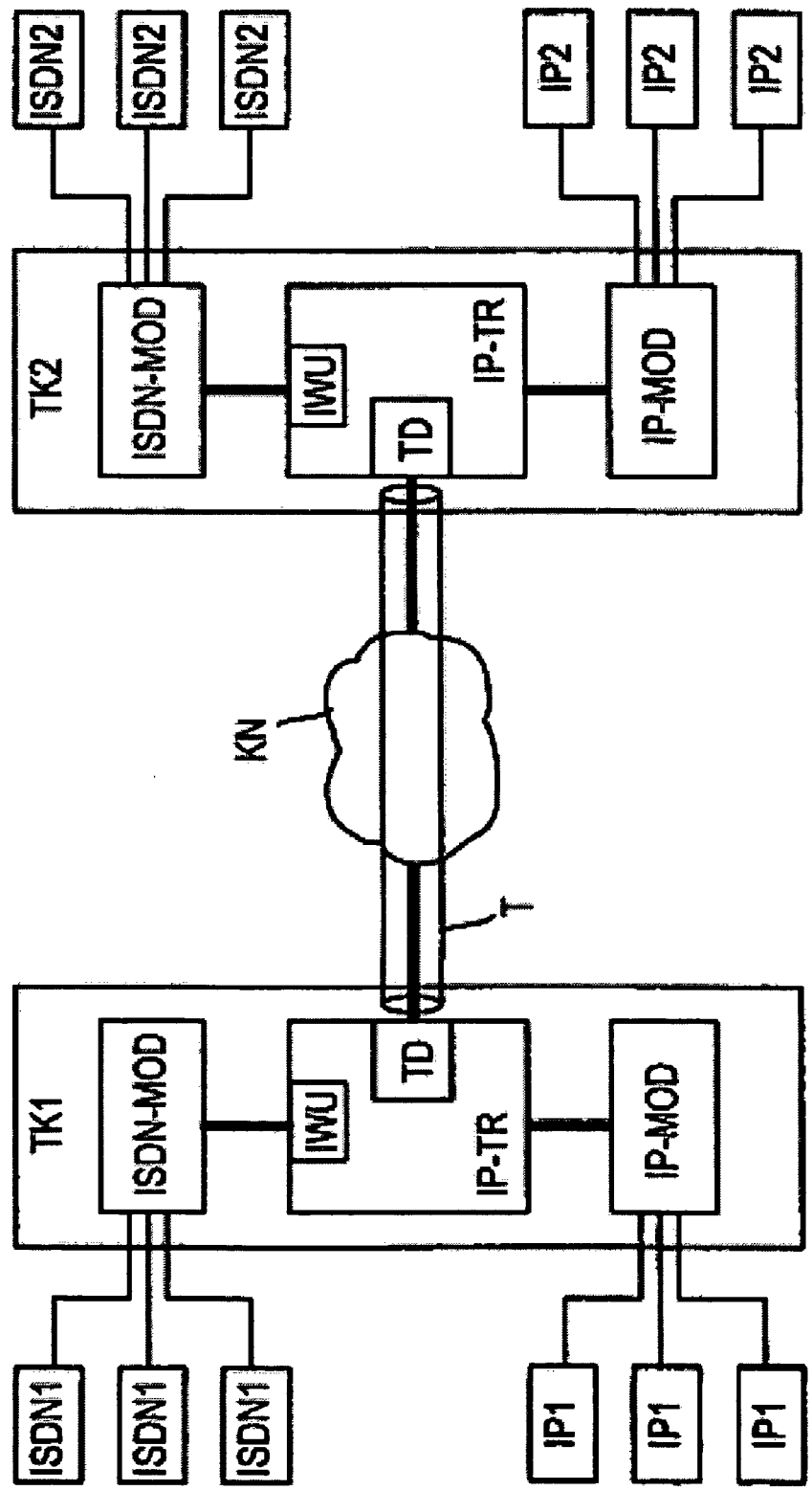
FIG. 1 is a block diagram of two communication systems coupled via a packet-oriented communication network.

Reference will now be made in detail to the preferred embodiments of the present invention, examples of which are illustrated in the accompanying drawings, wherein like reference numerals refer to like elements throughout.

FIG. 1 is a schematic illustration of two telecommunication systems TK1 and TK2 coupled via packet-oriented communication network KN, for example a local area network or a wide area network such as the Internet. For the exemplary embodiment shown, it is assumed that the telecommunication systems TK1 and TK2 support both line-oriented communication and packet-oriented VoIP communication.

ISDN (Integrated Services Digital Network) telephones ISDN1 are connected to the telecommunication system TK1 via ISDN subscriber assembly ISDN-MOD of the telecommunication system TK1, and IP terminals IP1 are connected via an IP subscriber assembly IP-MOD of the telecommunication system TK1. In a similar manner, ISDN telephones ISDN2 are connected to an ISDN subscriber assembly ISDN-MOD of the telecommunication system TK2, and also IP terminal devices IP2 to an IP subscriber assembly IP-MOD of the telecommunication system TK2. The IP terminals IP1 and IP2 are packet-oriented VoIP communication terminal devices, such as terminal devices for IP-based voice, video, fax, data and/or multimedia communication, or personal computers or communication applications or communication clients running on same. An IP terminal of this kind for voice communication is also frequently called an IP telephone.

The telecommunication systems TK1 and TK2 each have an IP trunking assembly IP-TR, through which the telecommunication systems TK1 and TK2 are coupled to the packet-oriented communication network KN. The IP subscriber assembly IP-MOD and also the ISDN subscriber assembly ISDN-MOD are connected to the IP trunking assembly. The latter is connected to this via a packet conversion module IWU of the IP trunking assembly IP-TR. The packet conversion module IWU is used for conversion between a line-oriented transmission protocol, in this case ISDN-based, of the ISDN telephones ISDN1 or ISDN2 and a packet-oriented, in this case IP-based, transmission protocol. The packet conversion module IWU converts the ISDN communication data streams in each case to a communication data stream formed of a sequence of IP data packets.

The IP trunking assemblies IP-TR also each have a transmission device TD by which they are coupled to the communication network KN. The transmission devices TD are used for the encrypted transmission of IP-based communication data streams via the packet-oriented communication network KN and provide a secure transmission tunnel T for VoIP data packets through the communication network KN.

Figure 2:
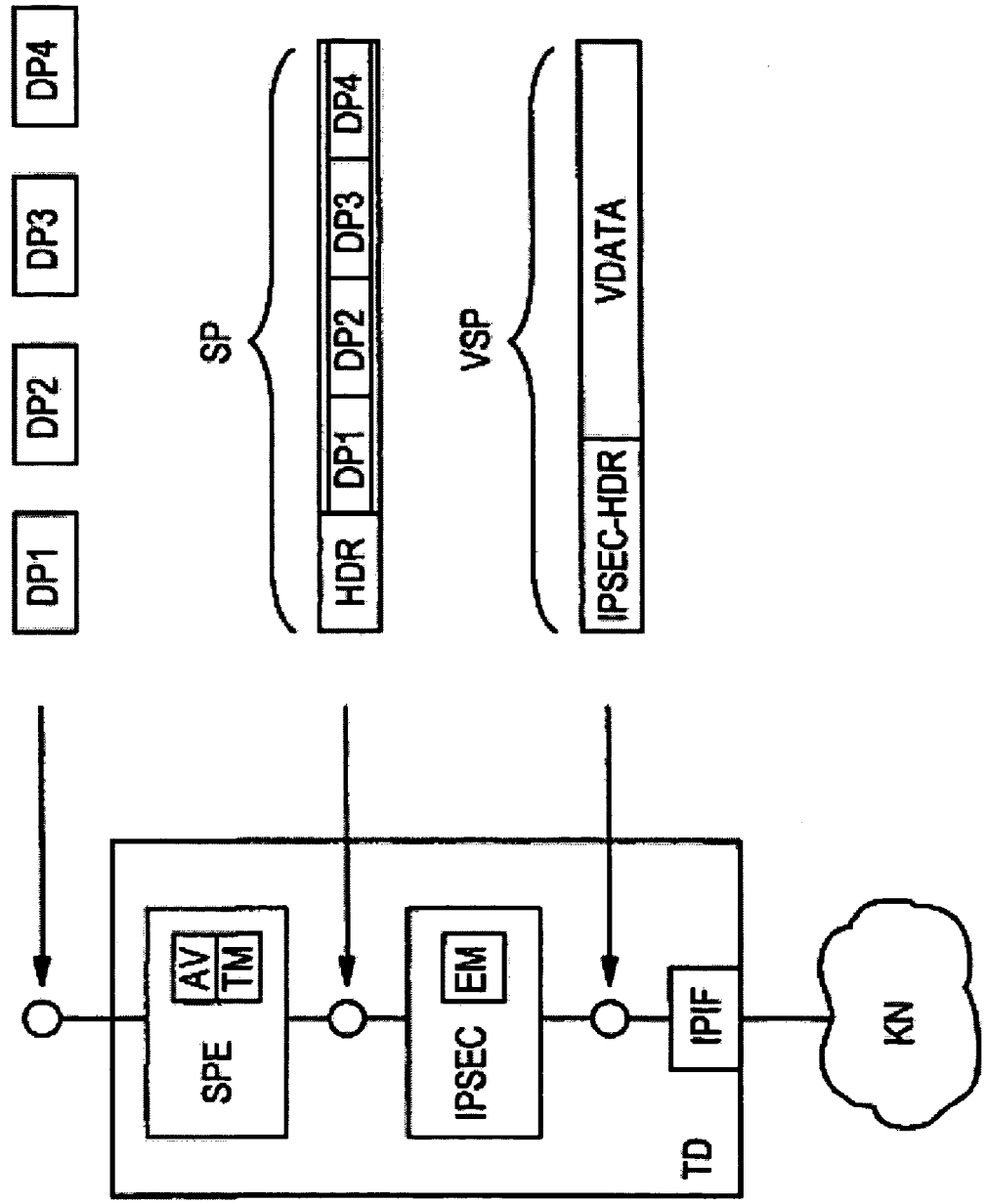
FIG. 2 is a block diagram of a transmission device for encrypted transmission of communication data streams.

FIG. 2 shows the transmission device TD in detail. The transmission device TD has a collective packet generator SPE with an address comparison device AV and a timer TM, an encryption module IPSEC with an encapsulating module EM and also an IP interface IPIF to the communication network KN. The collective packet generator SPE is coupled externally with the IP subscriber assembly IP-MOD and via the packet conversion module IWU to the ISDN subscriber assembly ISDN-MOD, as well as internally to the encryption module IPSEC. The encryption module IPSEC is in turn connected via the IP interface IPIF to the communication network KN.

The encryption module IPSEC is used to encrypt single IP data packets and for this provides the secure transmission tunnel T on layer 3 of the OSI reference module. In this exemplary embodiment, the encryption module IPSEC is realized by a standard IPSec (Internet Protocol Security) protocol stack. Compared with protocols active on layer 2 of the OSI reference module, such as PPTP, L2F or L2TP, the IPSec protocol is substantially more secure and enables a more secure Extranet to be constructed.

In the following, it is assumed that in the context of various communication connections existing in parallel, several VoIP communication data streams such as voice, video and/or multimedia data streams, from the IP terminals IP1 or the ISDN telephones ISDN1, are transmitted in parallel via the communication network KN in real time or quasi real time. The communication data streams in this case are fed to the collective packet generator SPE of the transmission device TD, if necessary after conversion by the packet conversion module IWU, in each case as a sequence of individual VoIP data packets.

It is assumed that within a time interval, that is short compared with the average time interval of successive IP data packets of the same communication data stream, four VoIP data packets DP1, DP2, DP3 and DP4, belonging to different communication data streams arrive at the collective packet generator SPE and are present in parallel in an input memory. The time interval is set or monitored by the timer TM. By checking the IP destination addresses of the IP data packets DP1, ..., DP4, the address comparison device AV determines which of the IP data packets DP1, ..., DP4 have a common transmission destination. In this exemplary embodiment, all IP data packets DP1, ..., DP4 have the same intermediate transmission destination, i.e., telecommunication system TK2. Consequently, all these IP data packets DP1, ..., DP4 are assembled by the collective packet generator SPE to form a collective IP data packet SP, that is transmitted to the encryption module IPSEC.

A substantial delay of the communication data streams can be avoided by the combination of IP data packets of different communication streams present in parallel (preferably all in parallel). A substantial delay would occur if it was necessary to wait for a succession of IP data packets of this communication data stream in order to form a collective IP data packet assigned to only a signal communication data stream.

In this exemplary embodiment, the collective IP data packet SP is a conventional IP data packet in accordance with the Internet protocol with an IP packet header HDR and a usable data area, in which the individual IP data packets DP1, ..., DP4 are inserted as a whole, i.e., including their particular packet headers. The insertion of complete IP data packets DP1, ..., DP4 is advantageous insofar as the packet headers can also be encrypted during the subsequent encryption, so that no information regarding the origin, destination or connecting parameters of the individual communication data streams can be read by unauthorized persons.

In encryption module IPSEC the data content of the collective IP data packet SP is encrypted and the encrypted data content is encapsulated by the encapsulation module EM in an encrypted collective IP data packet VSP. The encrypted collective IP data packet VSP is then transmitted via the IP interface IPIF to the communication network KN.

In this exemplary embodiment, the encrypted collective IP data packet VSP is a data packet in accordance with the Internet protocol with an IP packet header IPSEC-HDR and a useful data area containing encrypted data VDATA. The IP data packets DP1, ..., DP4 are encrypted in the encrypted data VDATA.

The amount of computing required to encrypt the collective IP data packet SP is usually substantially less than the amount of computing that would be required for the separate encryption of the individual IP data packets DP1, ..., DP4. When encrypting the collective IP data packet SP, the compute-intensive preparation of the encryption needs in fact to be carried out only once and not several times as is the case with separate encryption of each individual IP data packet DP1, ..., DP4. In practice, VoIP data packets mainly contain relatively little useful data, so as to reduce the transmission delay. Thus, for example, VoIP data packets produced by using Codecs in accordance with ITU-T recommendations G.729 or G.723 contain only 20 bytes of voice data each. For short data packets of this kind, the preparation of the encryption takes approximately twice as long as the performance of the encryption itself. If, as in this exemplary embodiment, four VoIP data packets DP1, . . . , DP4 are combined to form a collective IP data packet, in this case SP, three times the computing effort for preparing the encryption can be saved. The encryption of the one collective IP data packet SP thus requires only half as much computing expense as a separate encryption of the four single VoIP data packets DP1, . . . , DP4. The number of communication data streams that can be encrypted in parallel is thus doubled, with the computing power of the transmission device TD remaining the same.

The encrypted collective IP data packets VSP transmitted via the communication network KN are encrypted again at the transmission intermediate destination TK2 by its encryption module. The individual IP data packets DP1, . . . , DP4 are then unpacked from the encrypted collective IP data packet and forwarded corresponding to their individual IP destination addresses.

The invention has been described in detail with particular reference to preferred embodiments thereof and examples, but it will be understood that variations and modifications can be effected within the spirit and scope of the invention.

The invention claimed is:

1. A method for encrypted transmission of communication data streams, present as a sequence of IP data packets, via a packet-oriented communication network, comprising:
    forming, by a transmission device, collective Internet Protocol data packets, each containing several Internet Protocol data packets of different communication data streams;
    encrypting, by the transmission device, each collective Internet Protocol data packet by an encryption module to form encrypted collective Internet Protocol data packets; and
    transmitting, by the transmission device, the encrypted collective Internet Protocol data packets via the packet-oriented communication network.

2. A method in accordance with claim 1, wherein the encrypted collective Internet Protocol data packets are transmitted by an encrypted tunneling method on a network layer of an OSI reference model.

3. A method in accordance with claim 2, wherein said forming comprises:
    determining which of the different communication data streams have a common transmission destination, and
    forming at least one collective Internet Protocol data packet from Internet Protocol data packets of communication data streams with a common transmission destination.

4. A method in accordance with claim 3, wherein said determining and forming are performed on the Internet Protocol data packets of the different communication data streams that occur within a specified time interval.

5. A transmission device for encrypted transmission of communication data steams present in each case as a sequence of Internet Protocol data packets via a packet-oriented communication network, comprising:
    a collective packet generator forming collective Internet Protocol data packets, each containing several Internet Protocol data packets of different communication data streams;
    an encryption module encrypting at least one of the collective Internet Protocol data packets; and
    an Internet Protocol interface transmitting encrypted collective Internet Protocol data packets via the communication network.

6. A transmission device in accordance with claim 5, wherein said encryption module includes an encapsulation module encapsulating data of a first Internet Protocol data packet encrypted in the encryption module into a second Internet Protocol data packet.

7. A transmission device in accordance with claim 6, wherein said collective packet generator comprises:
    an address comparison device determining which of the different communication data streams have a common transmission destination; and
    a collective packet generation device forming the collective Internet Protocol data packets, each containing Internet Protocol data packets of the different communication data streams having the common transmission destination.

8. A transmission device in accordance with claim 7, further comprising a timer for setting a time interval, with the Internet Protocol data packets of the different communication data streams that occur within the time interval being combined to form a collective Internet Protocol data packet.

* * * * *